United States Patent [19]

Laeuffer

[11] Patent Number: 5,001,618

[45] Date of Patent: Mar. 19, 1991

[54] RIPPLE INSENSITIVITY METHOD FOR REGULATING THE VOLTAGE OF A VOLTAGE SIGNAL

[75] Inventor: Jacques Laeuffer, Paris, France

[73] Assignee: General Electric CGR SA, Issy les Moulineaux, France

[21] Appl. No.: 333,025

[22] Filed: Apr. 4, 1989

[30] Foreign Application Priority Data

Apr. 8, 1988 [FR] France .................... 88 04706

[51] Int. Cl.⁵ .................... H02M 3/315; H02M 7/523
[52] U.S. Cl. .................... 363/28; 378/106; 378/112
[58] Field of Search .................... 363/17, 28, 37; 378/106, 111, 112

[56] References Cited

U.S. PATENT DOCUMENTS

| | | | |
|---|---|---|---|
| 4,295,049 | 10/1981 | Ebersberger et al. | 378/112 |
| 4,541,041 | 9/1985 | Park et al. | 363/41 |
| 4,717,994 | 1/1988 | Diaz et al. | 363/17 |
| 4,741,010 | 4/1988 | Hino et al. | 378/112 |

FOREIGN PATENT DOCUMENTS

| | | | |
|---|---|---|---|
| 0138486 | 4/1985 | European Pat. Off. | |
| 2917594 | 11/1980 | Fed. Rep. of Germany | 378/112 |
| 2943816 | 5/1981 | Fed. Rep. of Germany | 378/112 |
| 3520509 | 12/1985 | Fed. Rep. of Germany | |
| 2184732 | 12/1973 | France | |
| 758098 | 8/1980 | U.S.S.R. | 378/112 |

*Primary Examiner*—William H. Beha, Jr.
*Attorney, Agent, or Firm*—Oblon, Spivak, McClelland, Maier & Neustadt

[57] ABSTRACT

A direct-current high voltage obtained by rippling, stepping-up and rectification of a direct-current low voltage is regulated in such a manner as to ensure that the maximum value of direct-current high voltage attains a predetermined peak value at each ripple pulse of the inverter. To this end, a following pulse of the inverter is produced as soon as the high voltage of the direct-current high-voltage signal has become lower than the predetermined peak value reduced by the measurement of a variation in said direct-current high voltage during a preceding pulse.

1 Claim, 3 Drawing Sheets

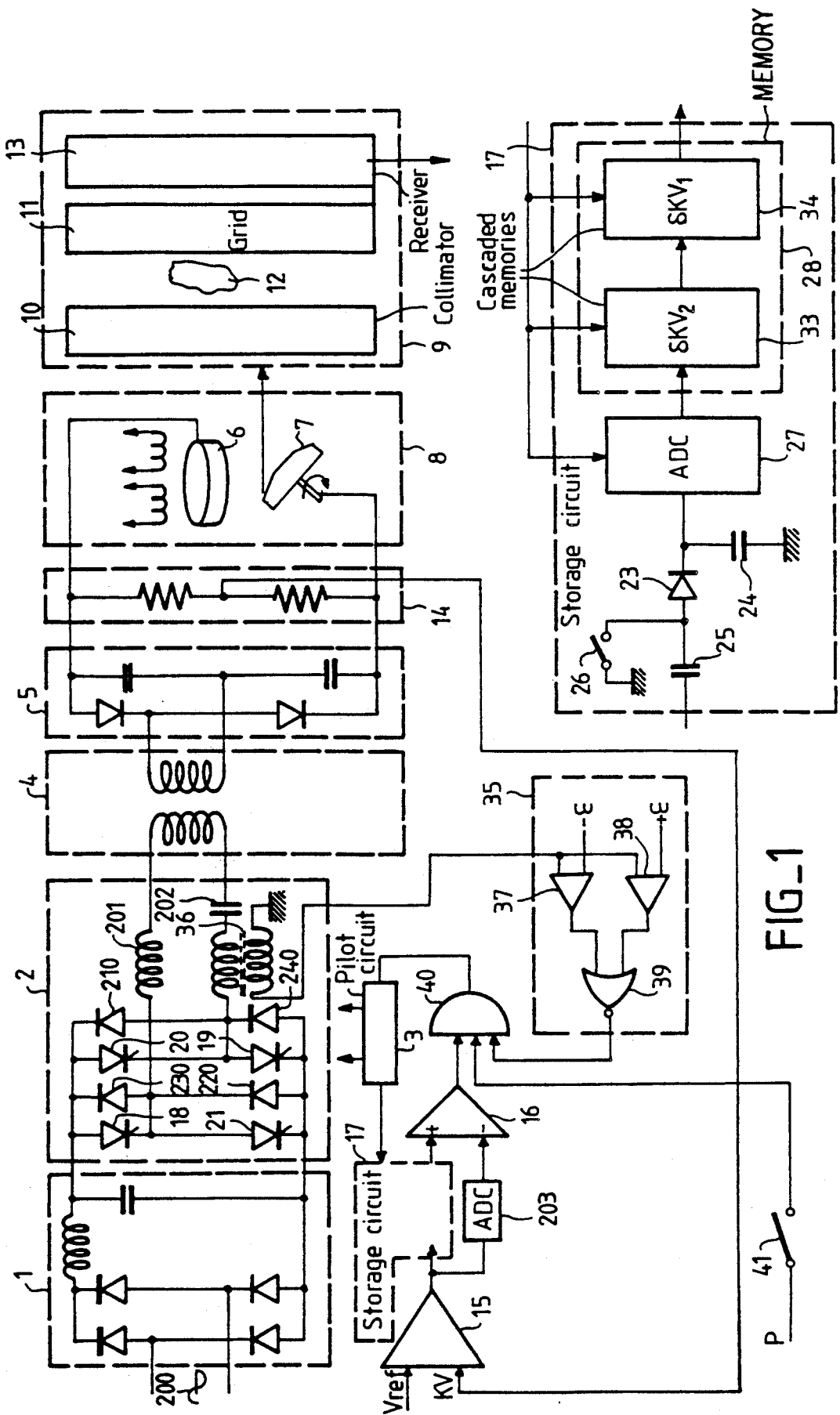
FIG_1

FIG_2-a
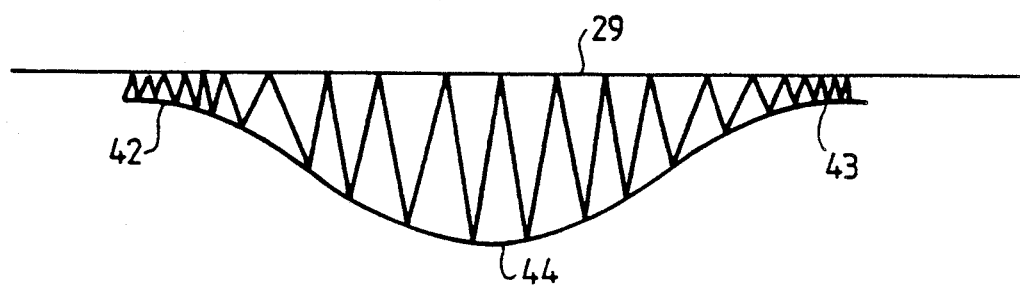
FIG_2-b PRIOR ART
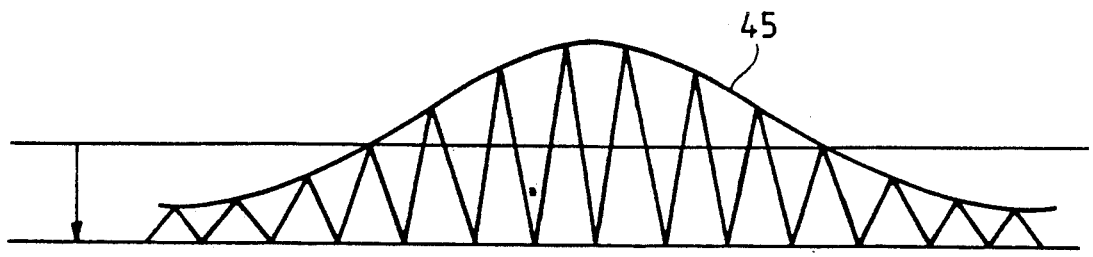
FIG_2-c PRIOR ART
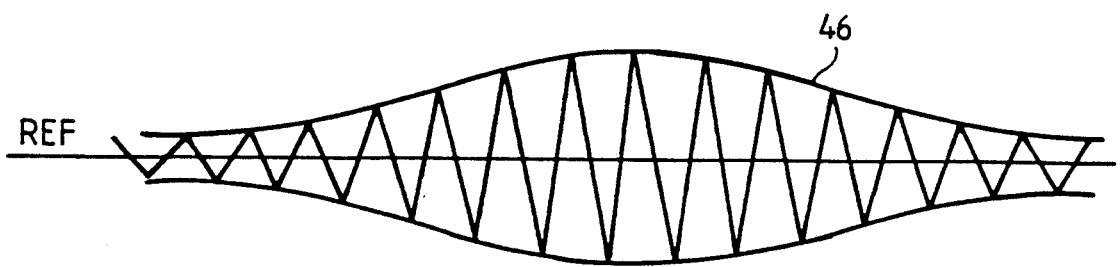

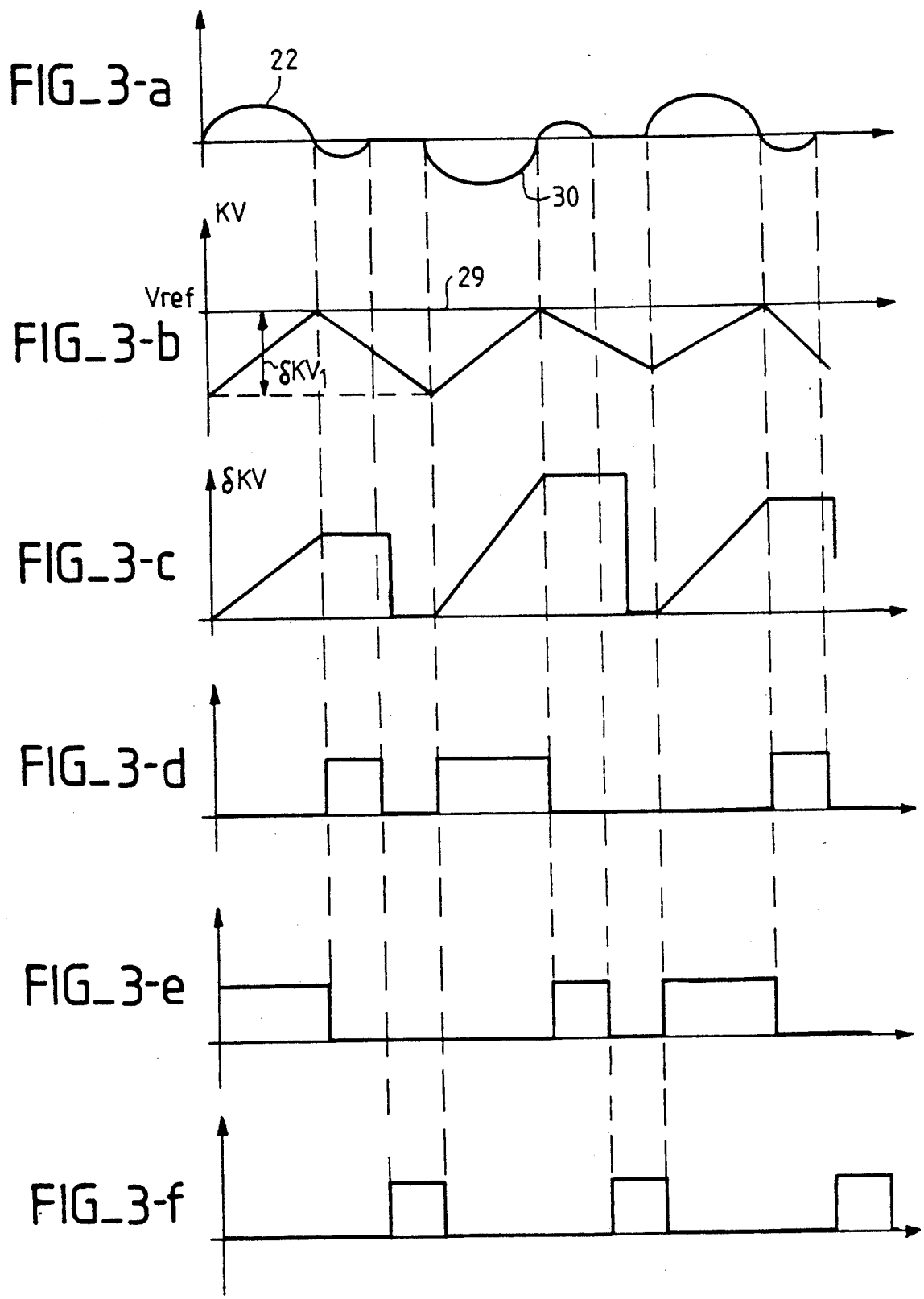

RIPPLE INSENSITIVITY METHOD FOR REGULATING THE VOLTAGE OF A VOLTAGE SIGNAL

BACKGROUND OF THE INVENTION

1. Field of the Invention

The present invention relates to a method for regulating the voltage of a voltage signal. In a general manner, the invention is concerned with applications involving control of a direct-current voltage which is produced from a non-regulated, chopped or rippled direct-current voltage which may be of high value, and which is then rectified. The invention is more particularly applicable to the medical field in which it is necessary to regulate the high voltage of x-ray emitting tubes with a view to achieving enhanced fidelity in the nature of the x-rays produced. The invention nevertheless finds applications in other fields. In the medical field, the invention is more particularly applicable to the field of mammography in which the quality of the high voltage conditions the homogeneity of the x-rays produced.

2. Description of the Prior Art

The principles of high-voltage supply of x-ray emitters are known. In the case of the so-called HF generators, they essentially make use of a direct-current low voltage which is chopped or undulated. This undulated or rippled low voltage is then applied to a step-up transformer and converted by this latter to a rippled high voltage. This rippled high voltage is then rectified and filtered so as to produce the desired direct-current high voltage. A signal which is representative of the high voltage thus produced can be collected by means of a voltage-dividing resistor bridge. This measuring signal is then compared with a reference value and an error signal is determined. Said error signal is then applied to a regulating device so as to maintain the high voltage produced at a reference value. As a general rule, the error signal is applied to a variable-frequency voltage-controlled oscillator (VCO). The variable frequency signal of this oscillator is applied as a control signal to the inverter.

The values usually accepted for the oscillating frequency of the inverter are of the order of 15 KHz. Since these inverters are usually of the thyristor type or consisting of transistors which permit the flow of current in a resonant circuit in one direction and then in the other, two sets of controlled semiconductor components are employed. The pilot circuit which makes use of these sets of semiconductor components delivers a signal having a double frequency of the order of 30 KHz. The duration of a pulse for turning-on the x-ray tube at the moment of radiography, in particular in a mammograph, is typically of the order of 300 ms. Throughout the following description of the invention, this radiographic pulse will be designated as an exposure. During this exposure, the high voltage between the cathode and the anode of the tube must increase to its nominal value as rapidly as possible. Throughout the duration of the exposure, said high voltage must then remain equal to this nominal value as far as possible. During one exposure, the number of pulses delivered by the pilot circuit is, with the values indicated, of the order of ten thousand. The number of pulses of this pilot circuit which is necessary in order to increase the high voltage from zero to the nominal value is usually of the order of 50.

In an inverter, at least one set of semiconductor components is connected to the terminals of a direct-current low-voltage circuit and is connected in series with an oscillating circuit and with a step-up transformer. When the semiconductor components are triggered into conduction by an inverter pulse, ripple is set up in the oscillating circuit and is converted by the step-up transformer. This ripple is then rectified by a rectifier downstream of the step-up transformer and is applied to a circuit for filtering said rectified high voltage. Said filtering circuit is essentially made up of capacitors. Throughout the duration of one exposure, these capacitors are therefore subjected on the one hand to a relatively constant discharge and on the other hand to periodic re-charges related to the arrival of the re-charge ripples. The constant discharge is related to the use of the x-ray tube, namely to the type of image which it is desired to produce.

In other words, the high voltage thus produced undulates and this is the case even if it is regulated. In fact, the undulation or ripple of said high voltage is related to the characteristic frequency of the inverter and that of the control circuit, and in fact disappears only if the x-ray tube has zero output. This is of no interest, however, since it is required to maintain the high voltage of the x-ray tube at a constant value during its output. The above-mentioned ripple of the high voltage produced is a consequence which is inherent in the principle of increase in direct-current voltage with a direct-current voltage supply.

Ripple can be attended by numerous disadvantages in medical radiography equipment. The hardness of x-rays is in fact very strongly affected by the high voltage available at the terminals of the x-ray tube. In fact, from the trough of the ripple of the direct-current high voltage to the crest of said ripple, the dispersion of hardness of the x-rays produced can be such that the available x-ray images are distorted. Their interpretation is unreliable.

In the present invention, the undulatory behavior of the high voltage produced has been studied and it has been possible to determine the fact that the undulatory behavior adopted by professionals up to the present time was not the best. In fact, the tolerated ripple, designated throughout the remainder of this description as $\delta KV$, is of the form:

$$\delta KV = f(KV, mA, E)$$

In this formula, KV represents the nominal value of the high voltage produced. The value mA represents the output of the tube. Finally, E represents the direct-current low voltage employed for producing the direct-current high voltage. The function f indicated is a complex function which takes into account the discharge KV and mA and the quality of the high-voltage filtering circuit after rectification. The value $\delta KV$ is normally lower than a certain percentage of KV. This percentage is established by customary practice in the profession. It may be 30% or even more in the case of machines which operate with a tolerated standard of degradation. It can be 4% in mammographs.

If E were perfectly constant, there would be obtained a ripple having an amplitude $\delta KV$ and having an approximately sawtooth waveform but which is especially constant. In the final analysis, homogeneity of the x-rays produced would be as already known. In actual practice, however, E is not constant. In fact, the direct-current low voltage employed can be a direct-current low voltage obtained from an electrical network in which the voltage is rectified. The direct-current low voltage E thus rectified fluctuates all the more by reason of the fact that the rectified line-supply signal is not even a three-phase line-supply signal but is on the contrary a single-phase line-supply signal. For example, a rectified single-phase 50-cycle line-supply signal produces a low voltage which in turn has 100-Hz ripples (with full-wave rectification). In other words, taking into account the values indicated, said direct-current low voltage oscillates on the order of 30 times during one exposure. The fluctuation in the direct-current low voltage results in faulty operation of the regulating system. In fact, while the characteristic curve of power transfer of an inverter is a function of the frequency (which is used for regulating), said curve is also a function of the voltage admitted at the input of said inverter. In other words, the power transmitted by the inverter at the moment of triggering of a pulse depends on the voltage supplied to said inverter.

The result thereby achieved is that the amplitude of fluctuation of the rippled high voltage is variable at the frequency of fluctuations of the direct-current low-voltage supply. This is related to the conceptual design of the regulating circuits. These circuits involve measurement of the high voltage produced. As soon as the value of the high voltage produced passes below the value of a reference voltage, the inverter is triggered and sends a re-charge pulse. Thus, when the low-voltage supply is low (in the trough of the ripples of said rippled low voltage), the power transmitted by the inverter is of low value. In consequence, the peak of rectified high-voltage ripple is relatively low in this case. On the other hand, if the direct-current low voltage is of high value (at the moment of the crests of the ripples of said rippled low voltage), the power transmitted by the inverter at each pulse is higher and the peak of the ripple of the rippled high voltage is also higher.

In both cases, re-charging of the filtering capacitors of the high-voltage rectifying circuit is initiated as soon as said high voltage becomes equal to the value of the reference voltage. The result thereby achieved is that, although the direct-current high voltage falls back to a value which is always identical at each re-charge pulse, said high voltage attains on the other hand different peak values as a function of the ripples of the low-voltage supply. In other words, the spectrum of the x-rays produced cannot be known in advance. Moreover, δKV is highly dependent on the state of the line-supply voltage and on the resistance of the supply line. This could have had little importance, however, by reason of the relatively large number (30) of periods of the line-supply signal during one exposure. But the foregoing is all the more true since in practice, during exposure, the mean value of the low-voltage supply undergoes a uniform drop, thus impairing the operation of the x-ray tube to a correspondingly greater extent. This type of regulation corresponds to pulsed regulation on minimum and is one of the less satisfactory types.

Another known type of regulation is concerned with linear regulation. In this case also, it can be demonstrated that the peak value of the high voltage produced also fluctuates in the same manner as the ripple of the low-voltage supply although in a proportion of one-half.

It has become apparent in the present invention that, while fluctuations of the low-voltage supply are inevitable, steps should preferably be taken to ensure that the ripple crests or peaks of the high voltage produced are located at a constant value, thus allowing the low-voltage ripple to produce action on the minimum values attained by the high voltage during the successive charges applied by the inverter.

In practice, it is therefore not the reduction in ripple amplitude related to the variation in low-voltage supply which is contemplated in the invention but rather the choice of a constant peak value of the high voltages produced In radiography, it is then certain that there will always be available an equal quantity of hard x-rays in the spectrum, irrespective of the operation of the tube. The output of less hard x-rays then bear the uncontrolled consequences of variations in the high voltage In the final analysis, rather than provide a known dose of less hard x-rays and an unknown dose of hard x-rays, the invention provides for a known dose of hard x-rays and for an unknown dose of less hard x-rays. This automatically results in higher precision of images since hard x-rays are the most conducive to formation of images.

In order to solve this problem which is essentially related to fluctuation of the low-voltage supply, it is necessary to take into account the fluctuations of said low voltage. It would have been feasible to compute in real time, or better still to tabulate, the variations of $f(KV,mA,E)$ as a function of the low-frequency ripples of E. In practice, it is known that, if E varies by 10%, δKV on the other hand can vary by 80%. A solution of this type is therefore possible in theory. But if it is recalled that E undulates at a frequency of 100 Hz, this makes it necessary to retain a shorter computation time than the period of said low-frequency fluctuation, e.g. 1 ms. Taking into account the number of operations to be performed, this computation time is too short to be validly employed (at low cost) in a radiography installation. In consequence, in an improvement of the invention, rather than perform a regulation which takes into account by computation both the variation in output high voltage and the variation in the low-voltage supply, it is preferred to perform the regulation by taking into account only the variations in output high voltage. In this case, however, the amplitude of this fluctuation is measured at each pulse of the inverter in order to apply, in respect of a following pulse of the inverter, a control which takes into account a preceding ripple variation.

SUMMARY OF THE INVENTION

The invention accordingly relates to a method for regulating the voltage of a voltage signal in which:
  ripple is produced in a first direct-current voltage signal by means of an inverter having an adjustable ripple-pulse frequency in order to produce a ripple-voltage signal,
  the voltage of the ripple-voltage signal is rectified and filtered in order to produce a second direct-current voltage signal,
  and the voltage of said second direct-current voltage signal is regulated by varying the frequency of the inverter,
the method being distinguished by the fact that it consists:
  in regulating the voltage of the second direct-current voltage signal in such a manner as to ensure that the maximum value of said voltage attains a predetermined maximum value at each ripple pulse.

In a preferred utilization of the invention, the first direct-current voltage signal is a low-voltage signal. The second signal is a high-voltage signal and, between the inverter and the rectifier, a transformer serves to step-up the voltage.

BRIEF DESCRIPTION OF THE DRAWINGS

FIG. 1 is a schematic diagram of a circuit for carrying out the method in accordance with the invention.

FIGS. 2a to 2c are diagrams showing comparative results of the high voltages produced in the method of the invention and in the present state of the art.

FIGS. 3a to 3f are time-waveform diagrams of signals encountered in the method of the invention.

DETAILED DESCRIPTION OF THE INVENTION

The schematic diagram of FIG. 1 illustrates a circuit for carrying out the method in accordance with the invention. This circuit comprises a first rectifier 1 for producing a direct-current low voltage, for example from a single-phase electric power supply line 200. The direct-current low-voltage circuit 1 supplies a resonance inverter 2 which is frequency-controlled by a pilot circuit 3. The ripple signal produced by the inverter 2 is increased in voltage in a step-up transformer 4. The high voltage produced by the transformer 4 is then rectified and then filtered in a rectifying and filtering circuit 5. The rectified high voltage is applied between the cathode 6 and the anode 7 of an x-ray tube 8. In one example, the x-ray tube is a rotating-anode tube and is employed in a mammograph 9. In accordance with a conventional design, the mammograph is provided with a collimator 10 and an antidiffusion movable grid 11 which are interposed on each side of a body 12 to be radiographically examined. A receiver 13 of a radiosensitive-film type or of a video type records the effects of x-radiation on the body 12.

A voltage-dividing bridge 14 serves to collect a signal KV which is representative of the high voltage produced. The signal KV is compared in a comparator 15 with a reference voltage $V_{ref}$. The comparator 15 is also an amplifier for employing an error signal of appreciable value. In accordance with the invention, this error signal is then transmitted schematically on the one hand directly and on the other hand indirectly to a second comparator 16. The indirect path includes an intermediate storage circuit 17. In substance, since the system operates in pulses, the storage circuit is such as to introduce into the comparator 16 a signal which is representative of the variation in the error signal measured at the time of a preceding pulse of the inverter.

The signal of the output of the comparator 16 is applied as a control signal to the pilot circuit 3 for controlling the thyristors of the inverter 2. Said inverter 2 has two sets of thyristors. A first set is made up of the thyristors 18 and 19 and a second set is formed by the thyristors 20 and 21. By way of example, during a first ripple pulse of the inverter 2, the thyristor 18 and the thyristor 19 are triggered into conduction by the pilot circuit 3. The voltage wavefront which passes through said thyristors is then converted by means of a resonant circuit 201–202 to a ripple 22 as shown in FIG. 3a. The return current, namely the negative portion of the ripple 22, is short-circuited by a set of diodes 230 and 240. The ripple signal 22 is stepped-up by the transformer 4, then rectified by the rectifier 5. The result thereby achieved is that the signal KV (FIG. 3b) undergoes a voltage rise. After this voltage rise, the high voltage available at the terminals of the x-ray tube 8 decreases as a function of the charge presented by said tube.

The storage circuit 17 is a peak storage circuit. Accordingly, the circuit comprises, for example, a diode 23 connected to a series capacitor 24. This arrangement constitutes a peak detector. Said peak detector is preceded by a circuit for the removal of the direct-current component. This removal circuit essentially comprises at the upstream end a capacitor 25 in series which is periodically connected to the ground of the downstream terminal at the start of each pulse. In other words, once the switch 26 has been momentarily closed, then re-opened (just before application of the pulse 22), the capacitor 25 transmits an error signal $\delta KV$ amplified by the comparator-amplifier 15. This signal $\delta KV$ reproduces, subject to the voltage $V_{ref}$, the increasing variations in the rectified high voltage. On the other hand, whereas the rectified high voltage drops at the end of application of the pulse of the inverter, the error signal is maintained constant at its peak value by the presence of the diode 23 of the peak detector. The signal which is representative of the peak value of the error signal is then transmitted to a memory 28. This memory 28 performs a buffer-memory function. If the memory 28 is of the digital type, it must be preceded by an analog-to-digital converter 27. The memory 28 is preferably of the analog type. Said memory makes it possible to present to the comparator 16 an item of information which is representative of the preceding progressive variation of the rectified high voltage at the time of application of a following pulse of the inverter. The signal $\delta KV$ after its peak has been stored in memory can be designated as $\delta KV_m$. In order to ensure uniformity of the treatments applied to $\delta KV$ and to $\delta KV_m$, the direct path can also be provided if necessary with an analog-to-digital converter 203 in series.

The error signal $\delta KV$ is applied to the comparator 16 in order to be compared with the value of the signal $\delta KV_m$ obtained at the time of a preceding ripple pulse. Cascade connection of the two comparators 15 and 16 and of the memory 28 accordingly has the effect of finally comparing KV, not with the reference voltage, but with the reference voltage reduced by the variation in rectified high voltage during a preceding ripple pulse. The effects of such a comparison are as follows: if the ripple variations during the preceding pulses have been constant and finally if the phenomenon of low-voltage ripple has not taken place, perfect regulation is obtained. Whether the reference is taken at one given value or at another, the important condition is that it should be constant But since this phenomenon of direct-current low-voltage ripple takes place, it is apparent that, in the present invention, the high current delivered is not compared each time with a constant value but on the contrary with a variable value and this variable value takes into account the fluctuations of the low voltage. This is an essential element of the invention. As will be readily understood, the regulation is so designed that the high voltage delivered attains peaks always at the same height. This is represented in FIGS. 2a and 3b by the envelope 29 of the peaks of the high voltage produced.

The operation of the device is as follows. It will be assumed that the peak value due to the variation in high voltage while the filtering circuit 5 is being charged during one pulse of the inverter was $\delta KV_m$. The comparators 15 and 16 have the intended function of triggering the pilot circuit 3 and therefore the inverter 2 as soon as the high voltage becomes lower than $V_{ref} - \delta KV_1$. A ripple 30 is then applied by the inverter 2 (FIG. 3a). For reasons which will become apparent hereinafter, said ripple is a half-wave opposite to the half-wave 22 but nevertheless has the same effects and undergoes the same treatment as the pulse 22 in regard to its results. In other words, it is observed that with the invention, a following re-charge pulse is sent by means of the inverter all the more belatedly as the measured effects of the preceding charge have been found to be greater. It is intuitively understood that, if the low voltage was previously in a favorable situation (it was, for example, at a maximum value of ripple), the effects on the charge of the filtering circuit 5 were accordingly substantial In this case the high voltage delivered will have had a tendency to increase sharply. In order to avoid excessively generous recording of this favorable situation of the direct-current low-voltage supply at this moment, application of the pulse of the following charge is delayed. To simplify, the pulse is delayed precisely as a function of this value of recharge. In practice, the high voltage is allowed to decrease over a waiting period which is longer as the charge was higher. On the other hand, if it is assumed that the ripple of the low-voltage supply was in an unfavorable situation, re-charging of the filtering capacitors 5 will be slight and $\delta KV$ will be of low value. In this case, application of a succeeding recharge pulse will be initiated at an earlier instant. The following pulse is triggered as soon as possible. The result thereby achieved is that, during unfavorable low-voltage stages, the inverter 2 produces ripples at a higher frequency than during the favorable low-voltage stages. It is accordingly understood that, as a result of this mode of operation, the high voltage produced by the filtering circuit 5 has peak values such that the envelope is a horizontal straight line.

For reasons of operation of the alternating type, a second set of thyristors 20 and 21 is put into service alternately with the set of thyristors 18 and 19. The set of thyristors 20 and 21, in common with complementary diodes 210 and 220, performs a function which is similar (but with a polarity of opposite direction) to the function of the set of thyristors 18 and 19. The set of thyristors 20 and 21 gives rise to the ripple 30. In the case of high-voltage applications, the effects of the two sets of thyristors are not equal. In consequence, the operation would not be perfect if the ripples 30 were initiated as a function of the measurements made during a charge of the filtering circuit 5 due to the ripples 22. To this end, the memory 28 is made up two cascaded memories 33 and 34 which make it possible by means of the action of the cascade to present to the comparator 16 the variation in reference value which corresponds to the adequate half-wave to be corrected.

Thus the memory 33 is in relation with the memory 34. When the diode 23 produces the value $\delta KV_1$, this value is stored in the memory 33. When, during the following pulse, the diode 23 produces the value $\delta KV_2$, this latter takes the place of the value $\delta KV_1$ in the memory 33. Said value $\delta KV_1$ is then driven into the memory 34 whilst the preceding content of the memory 34 is then applied to the comparator 16 in order to correct the effects of the high voltage presented by the variation. The pilot circuit 3 in fact serves to reverse the sets of thyristors at each ripple pulse as well as to turn-on the switch 26 in a synchronized manner together with the converters 27 and 203 which may be provided and to initiate a shift between the memories 33 and 34 and the comparator 16.

In a preferred embodiment, the method is carried out with inverters of the non-continuous type. Inverters of the non-continuous type are inverters in which the ripples 22 and 30 including their ripple tail cannot be present at the same time. With this objective, there is provided a validation circuit 35 which serves to measure the flow of current within the oscillating circuit 201–202 of the inverter 2. By way of example, a small collecting transformer 36 is put in series in the oscillating circuit. The collected signal which is representative of the current is applied within the circuit 35 to a double set of comparators 37 and 38. In these comparators, said signal is compared respectively with $-\epsilon$ and with $+\epsilon$ ($\epsilon$ being a reference of low value). The signals available at the output of these comparators are shown respectively in FIGS. 3d and 3e. They represent the polarity of the current. The output signals of the comparators 37 and 38 are then applied to the inputs of a NOR-gate 39, the output signal of which is shown in FIG. 3f. The output signal of the NOR-gate 39 is the validation signal produced by the validation circuit 35. As long as the validation signal of said circuit 35 is at zero, an AND-gate 40 which receives said validation signal prohibits transmission of a control signal to the pilot circuit 3. The circuit 35 thus ensures time discontinuity between the application of the ripples 22 and 30. The gate 40 also receives an exposure signal P applied on the initiative of an operator who depresses a switch 41.

When the switch 41 is closed by an operator, for example, the pilot circuit 3 puts one of the sets of thyristors into service. A ripple pulse is produced by the inverter. The transformer 4 steps-up the voltage of said ripple. This stepped-up voltage is rectified by the circuit 5. Taking into account the high value of the reference (corresponding to the nominal high voltage $V_{ref}$ to be attained), the comparator-amplifier 15 and the comparator 16 are then saturated. The signal available at the output of the comparator 16 and at a corresponding input of the gate 40 is then at 1 as long as said reference voltage has not been attained. Under these conditions, the circuit 35 validates delivery of pulses by the inverter 2 with a minimum delay between the end of one pulse and the start of the next pulse. In practice, said end and said start are practically simultaneous. In consequence, the high voltage rises rapidly within tee rectifying and filtering circuit 5 to its expected nominal value. The validation circuit 35 therefore serves only to produce discontinuity of operation of the inverter between the half-waves of two types which it is capable of producing.

As soon as the high voltage comes close to the reference value, the circuit 17 comes into action so that the maximum of said high voltage should have a value equal to the imposed reference value.

FIG. 2a shows the waveform of the high-voltage signal obtained by means of the method in accordance with the invention. FIGS. 2b and 2c show the waveforms of the signals which were previously obtained in the prior art. In FIG. 2a, there can clearly be distinguished the stages 42 and 43 during which the ripple of the low-voltage supply has been unfavorable and during which the inverter has operated at a higher frequency (since it has been triggered earlier each time). The ripples are located very close to each other. On the other hand, during the favorable stages 44, the frequency of the inverter is lower but the charges are higher (since triggering has taken place later). In FIGS. 2b and 2c, there are shown the envelopes 45 and 46 of the peak values respectively of the regulated high voltage, according as the regulation consisted of pulsing on the minimum with correction of reference value or else was of the conventional linear type. In all cases, FIGS. 2b and 2c show that an envelope 29 in the form of a straight line is not obtained in respect of peak values of the high voltage. In the invention, with an envelope of peak values in the form of a straight line, it is ensured that the spectrum of hard x-rays is not dispersed.

What is claimed is:

1. A method for regulating the voltage of a voltage signal, comprising the steps of:

producing a ripple in a direct-current low voltage signal by means of a resonance invertor having an adjustable pulse frequency to thereby provide a low ripple-voltage signal;

stepping up said low ripple-voltage signal in order to produce a high ripple-voltage signal;

rectifying and filtering a voltage of said high ripple-voltage signal in order to produce a direct-current high voltage signal;

regulating a voltage of said direct-current high voltage signal;

measuring a variation of said voltage of said direct-current high voltage source during a ripple pulse of said invertor; and gating the starting time of said invertor for a following ripple pulse wherein said gating occurs as soon as the high voltage of the direct-current high-voltage signal has become lower than a predetermined peak value minus said measurement of variation of said direct-current high-voltage during a preceding time, to thereby insure that the maximum value of said direct-current high-voltage signal reaches a predetermined maximum value at each ripple pulse;

validating the operation of said invertor at each pulse in order to avoid production of a following pulse prior to the end of a preceding pulse.

* * * * *